United States Patent
Bakker

[15] 3,640,739
[45] Feb. 8, 1972

[54] HIGH ALUMINA REFRACTORIES

[72] Inventor: Wate T. Bakker, Severna Park, Md.

[73] Assignee: General Refractories Company, Philadelphia, Pa.

[22] Filed: May 29, 1969

[21] Appl. No.: 829,132

[52] U.S. Cl. ................................... 106/65, 106/67
[51] Int. Cl. .......................................... C04b 35/10
[58] Field of Search .............................. 106/65, 67

[56] References Cited

UNITED STATES PATENTS

| | | | |
|---|---|---|---|
| 2,559,343 | 7/1951 | Caton | 106/65 |
| 3,067,050 | 12/1962 | Miller | 106/65 |
| 3,230,102 | 1/1966 | Miller | 106/65 |
| 3,303,034 | 2/1967 | Troell et al. | 106/65 |

*Primary Examiner*—James E. Poer
*Attorney*—Everett H. Murray, Jr. and Francis D. Neruda

[57] ABSTRACT

Disclosed herein is a refractory brick batch mix which consists essentially of, by weight, about 85 to 96 percent alumina, about 3.99 to 13.99 percent silica, about 0.01 to 0.5 percent of a lithium compound capable of oxidizing to lithium oxide, and about 1 to 5 percent bentonite. Refractories prepared from these mixtures exhibit increased strength, higher density, lower porosity and higher refractoriness compared to those previously available.

8 Claims, No Drawings

HIGH ALUMINA REFRACTORIES

This invention relates to refractories of high-alumina content by which is meant, for the purposes of this invention, refractories containing at least about 50 percent by weight of $Al_2O_3$.

High-alumina refractories are generally classified by their $Al_2O_3$ content in groups having, approximately, 50, 60, 70, 80, 90, or 99 percent $Al_2O_3$ by analysis. Those containing 50 to 90 percent $Al_2O_3$ are prepared by blending various high-alumina refractory materials, while those containing as much as 99 percent $Al_2O_3$ are essentially high-purity alumina. The most common high-alumina refractory materials and their typical $Al_2O_3$ contents are fused alumina, 99.5 percent; sintered alumina, 99.5 percent; calcined alumina, 99 percent; fused bauxite, 95 percent; calcined South American bauxite, 88 percent; calcined Alabama bauxite, 74 percent; calcined diaspore, 76 percent; burley diaspore, 48 and 58 percent; and kyanite, 56 percent. All of these materials are chemically compatible, and so they can be blended to provide almost any desired resultant alumina content.

The present invention is concerned with those high-purity high-alumina refractories containing by weight in the range of about 85 to 95 percent alumina. In addition to the alumina, these refractories generally contain in the range of about 5 to 15 percent silica with minor amounts of impurities such as $TiO_2$, $Fe_2O_3$, alkalies and alkaline earths normally associated with the alumina and silica ores.

Ordinarily, high-alumina refractory bricks or shapes are manufactured from relatively pure, high-density $Al_2O_3$ grog material and a siliceous binder. Traditional forms of silica used for this purpose are various kinds of clays, usually kaolin or ball clay, and ground silica sand. The use of clay, at least in large amounts, is objectionable because during firing the clay decomposes into mullite and a glassy phase, the glassy phase forming the bond between the grog grain, which structure decreases the refractoriness of the brick under load. The use of ground silica, on the other hand, increases the refractoriness under load of the brick, probably because the silica reacts with the alumina in the solid state to form mullite so that little or no glass is formed. However, because of the low reactivity of the silica, this reaction is slow and only very little mullite is formed at conventional burning temperatures. Therefore, these refractories have a low-cold strength and most of the mullite in the brick is formed during service leading to an undesirable large reheat expansion.

It was discovered that high-alumina refractories possessing high-cold strength and low-reheat expansion could be prepared by incorporating in the batch mix about 0.05 to 0.2 percent of lithium fluoride or lithium carbonate and about 0.01 to 0.3 percent of at least one compound selected from the group consisting of calcium hydroxide, magnesium hydroxide and iron oxide. Such refractories are described in U.S. Ser. No. 741,333 which was filed on July 1, 1968 and is in the hands of a common assignee and incorporated herein by reference thereto. While refractories prepared in this manner exhibit characteristics superior to those of the prior art, they lack sufficient high-pressed density and low porosity. Accordingly, the discovery of a means whereby these shortcomings could be overcome simply and economically would constitute a significant and important advance in the art. The present invention provides just such a means.

It is among the objects of this invention to provide high alumina refractories which, as compared with those previously available, are of increased strength, higher density, lower porosity, and higher refractoriness, and which may be produced from readily available high-alumina materials by practices which are customary in the refractory trade.

Another object is to provide a brick batch mix suitable for producing refractories in accordance with the foregoing object.

A further object is to provide a simple and economical method of making refractories in accordance with the first-named object.

Still other objects and advantages will become apparent from a consideration of the following specification and claims.

The present invention is predicated upon the discovery that the incorporation of a small amount of a lithium compound to a high-alumina refractory batch mix, as hereinafter discussed in detail, plus a small amount of bentonite, as also discussed hereinafter, increases the pressed density of the resulting burned brick while at the same time decreasing its apparent porosity without deleteriously affecting its refractoriness under load. In fact, improvement in the refractoriness under load has been realized through the stated additions.

More specifically, the present invention involves a high-purity alumina refractory brick batch mix consisting essentially of, by weight, about 85 to 95 percent alumina; about 3.99 to 13.99 percent silica; about 0.01 to 0.5 percent of at least one lithium compound; and about 1 to 5 percent of bentonite. Preferably, the refractory brick batch mix will consist essentially of, by weight, about 88 to 92 percent alumina; about 5.95 to 9.95 percent silica; about 0.05 to 0.2 percent lithium compound; and about 2 to 3 percent bentonite. The percentages employed herein are based on the total weight of the refractory mix.

As noted hereinbefore, alumina is available in varying grades and purities. Generally the alumina employed in this invention will be a "high purity" grade, that is, it will contain at least about 99 percent $Al_2O_3$, preferably at least about 99.5 percent $Al_2O_3$. The alumina grog may comprise alumina which is sintered, tabular, fused, calcined or the like. However, as is common in high-alumina refractory brick manufacture, a significant portion of the alumina will ordinarily constitute relatively coarse particles, and the remaining portion will be made up of relatively fine particles. Thus, for example, from about 50 to about 65 percent, by weight, of the alumina will be in the range of −6 to +48 mesh (Tyler) and the balance (from about 35 to about 50 percent, by weight) will be −48 to −400 mesh. Preferably, at least about 10 to 30 percent by weight, of the alumina will be −325 mesh or finer.

Similarly, the silica component will also be a high-purity material, that is, containing at least about 99 percent $SiO_2$, preferably over 99.5 percent $SiO_2$ and especially about 99.9 percent $SiO_2$. In this respect, ground glass sand is particularly suitable. Generally, silica will be substantially −200 mesh, and preferably at least about 50 percent, by weight, thereof will be −325 mesh or finer.

In addition to the alumina and silica, the refractory brick batch mix will have incorporated therein bentonite and a lithium compound. The lithium compound employed should be capable of forming, that is, oxidizing to lithium oxide during the firing of the pressed brick batch mix when said lithium compound is present therein. Lithium carbonate and lithium fluoride are particularly suitable in this respect. Lithium fluoride is especially preferred. However, the lithium carbonate is quite desirable because of its relative cheapness and ease of handling. Whichever lithium compound is employed, such should be relatively finely divided, that is, substantially all thereof should be −100 mesh, and preferably −325 mesh. As previously indicated, the amount of lithium compound incorporated in the mix should constitute about 0.01 to 0.5 percent thereof. Higher amounts markedly decrease the refractoriness under load of the resulting brick.

The other essential component incorporated in the mix according to the present invention is the mineral bentonite. As with most naturally occurring substances, the composition of bentonite will vary to some degree. The chemical analysis of a typical bentonite utilizable in accordance with this invention would be as follows:

| Component | percent |
|---|---|
| $Al_2O_3$ | 21.08 |
| $SiO_2$ | 63.07 |
| $TiO_2$ | 0.14 |
| $Fe_2O_3$ | 3.50 |
| CaO | 0.65 |
| MgO | 2.67 |
| Alkalis | 2.57 |
| Loss on Ignition | 5.6 |

This material is comparatively inexpensive and readily available. Generally, as is the case with the lithium compounds, the bentonite should be relatively fine. Specifically, the major portion thereof should be −100 mesh, and preferably −325 mesh.

Depending upon the other components of the brick batch mix, varying amounts of bentonite will be necessitated in order to achieve the benefits of this invention. The amount of bentonite utilized will be in the range, by weight, from about 1 to 5 percent and preferably from about 2 to 3 percent. It is, of course, well within the skill of one knowledgeable in the art to determine the most satisfactory combination of components within the stated ranges for any particular brick batch mix.

As stated, the refractory brick batch mix of the present invention consists essentially of alumina, silica, a lithium compound which will form lithium oxide during burning, and bentonite. However, small amounts of other materials may be incorporated in the batch mix without deleteriously affecting the properties of the resulting brick. For example, phosphoric acid may be included to enhance the cold strength. Other binders, such as sodium lignosulfonate may be included to impart green strength and lubrication. When phosphoric acid is employed, it will usually be present in the range of about 1 to 4 percent, by weight, preferably from about 2 to 3 percent (as a 75 percent aqueous solution of H3PO4). On the other hand, when a lignosulfonate binder is employed, it will ordinarily be present in an amount of from about 1 to 2 percent, by weight, as a 50 percent solution in water or from about 0.5 to 1 percent, on a dry basis.

Generally, in preparing bricks from the mixes described herein, the mix will first be tempered with a small amount of water. Some or all of the water may be provided by binders of the type discussed above. In general, the total water will range from about 2.5 to 6 percent, by weight, preferably from about 3 to 5 percent.

In preparing the mix, the materials may be blended in accordance with conventional refractory practice. For example, a muller mixer may be employed in which case it is preferred to first add the coarse materials to the pan along with the major portion of the moisture. This is followed by the finer materials and the remainder of the moisture. Mixing is continued until proper consistency is achieved.

The tempered mix is then pressed into the desired refractory brick shape. It should be noted that the term "brick" is used in its generally accepted meaning in the refractory art. Specifically, such is not intended to limit in any way the design or physical configuration of the refractories that can be prepared in accordance with this invention. Generally, pressing of the brick necessitates a pressure of at least about 4,000 p.s.i. which may range up to about 15,000 p.s.i. A preferred pressure is in the range of about 8,000 to 10,000 p.s.i. After pressing and drying, the shaped brick is fired at a temperature which is effective to provide the ceramic bond. Ordinarily, firing is conducted at a temperature which may range from about 1,200° to 1,700° C. and preferably 1,300° to 1,500° C.

The many facets of this invention are further illustrated by the following examples which are not to be construed as limitations thereof. On the contrary, resort may be had to various other embodiments, modifications and equivalents of these examples which readily suggest themselves to those skilled in the art without departing from the spirit of the present invention and/or the scope of the appended claims.

EXAMPLE I

A brick batch mix is prepared from the following: 60 percent, by weight, −6 mesh fused alumina grog; 20 percent −48 mesh sintered alumina fines; 10 percent −325 mesh calcined alumina fines; and about 8 to 10 percent −200 mesh silica sand. To three separate portions of this mix, there is incorporated the additives set forth in table I. Mix A is representative of the prior art and Mix B contains only bentonite. Mix C contains both LiF and bentonite in accordance with the present invention. Each mix is then tempered with an aqueous magnesium lignosulfonate solution and hydraulically pressed into 9×4½×2½ inch bricks at 10,000 p.s.i. Thereafter, the bricks are fired for 5 hours at 1,450° C. After cooling, the physical properties and characteristics of the fired specimens are determined by means well known to those skilled in the art. These results are set forth in table I.

TABLE I

| | Mix A | Mix B | Mix C |
|---|---|---|---|
| Additions | 0.1% LiF, 0.05% Ca(OH)$_2$, 0.05% Mg(OH)$_2$ | 2% bentonite | 2.0% bentonite, 0.1% LiF |
| Physical properties: | | | |
| Bulk density oz./in.$^3$ | 1.68 | 1.72 | 1.72 |
| G./cc | 2.91 | 2.98 | 2.98 |
| Apparent porosity, percent | 18.6 | 18.3 | 15.7 |
| Modulus of rupture, p.s.i.: | | | |
| Room temperature | 1,800 | 2,970 | 3,470 |
| 1,400° C | 1,160 | 1,740 | 1,680 |
| 1,500° C | 810 | 1,150 | 1,380 |
| 1,600° C | 660 | 910 | 1,350 |
| Deformation under load, 25 p.s.i. at 1,700° C. (1½ hrs. hold) | 0.1 | 0.1 | 0 |

As is observable from the results set out in table I, the bricks prepared from Mix C are not only markedly less porous, but they also exhibit superior strength when compared to those from Mixes A and B.

EXAMPLE II

In a manner similar to example I, bricks were prepared from three different mix compositions. Two of the mixes had bentonite and LiF incorporated therein. The third (Mix F) contained kaolin, Ca(OH)$_2$, Mg(OH)$_2$ and LiF but no bentonite. This latter mix was representative of the prior art, namely, such as was taught by U.S. Pat. No. 741,333 which was noted heretofore. However, in all of the mixes 3 percent phosphoric acid was used as the binder rather than the Lignin. The specific compositions of each of the brick mixes along with the physical properties of the bricks produced therefrom are set out in table II.

TABLE II

| Mix Composition, % | Mix D | Mix E | Mix F |
|---|---|---|---|
| Fused Alumina | | | |
| −6 Mesh | 55.0 | — | 55.0 |
| Sintered Alumina | | | |
| −6 Mesh | — | 60.0 | — |
| −48 Mesh | 15.0 | 15.0 | 15.0 |
| Calcined Alumina | | | |
| −325 Mesh | 15.0 | 15.0 | 15.0 |
| Silica Sand | | | |
| 200 Mesh | 8.0 | 8.0 | 8.0 |
| Kaolin | — | — | 3.0 |
| Bentonite | 2.0 | 2.0 | — |
| LiF | 0.1 | 0.05 | 0.5 |
| Mg(OH)$_2$ | — | — | 0.05 |
| Physical Properties | | | |
| Bulk Density, | | | |
| oz./in.$^3$ | 1.75 | 1.70 | 1.77 |
| g./cc. | 3.03 | 2.94 | 3.06 |

| Apparent Porosity, % | 14.2 | 12.9 | 14.5 |
|---|---|---|---|
| Modulus of Rupture, p.s.i. | | | |
| Room Temperature | 3020 | 3330 | 3450 |
| 1,400° C | 2900 | 2820 | 1980 |
| 1,500° C | 2180 | 2410 | 1930 |
| 1,600° C | 1720 | 2090 | 1080 |
| Deformation Under Load, 25 p.s.i. 1½ Hrs. | | | |
| Hold 1,700° C. | 0 | 0 | 0.4 |

It is apparent from the results set out in table II, that while the bricks prepared from Mix F do exhibit desirable physical properties, they are not as good as those from Mixes D and E.

I claim:

1. A refractory brick batch mix consisting essentially of, by weight, about 85 to 95 percent alumina, about 3.99 to 13.99 percent silica, about 0.01 to 0.5 percent of at least one lithium compound and about 1 to 5 percent bentonite, said lithium compound being capable of forming lithium oxide during the firing of the pressed brick batch mix.

2. A refractory brick batch mix according to claim 1 consisting essentially of, by weight, about 88 to 92 percent alumina, about 5.95 to 9.95 percent silica, about 0.05 to 0.2 percent of said lithium compound and about 2 to 3 percent bentonite.

3. A refractory brick batch mix according to claim 1 wherein said alumina contains at least about 99 percent $Al_2O_3$ and said silica contains at least about 99 percent $SiO_2$.

4. A refractory brick batch mix according to claim 3 wherein said alumina is at least about 99.5 percent $Al_2O_3$ and said silica is at least about 99.9 percent $SiO_2$.

5. A refractory brick batch mix according to claim 3 wherein at least about 10 to 35 percent, by weight, of said alumina will be −325 mesh or finer and at least about 50 percent, by weight, of said silica will be −325 mesh or finer.

6. A refractory brick batch mix according to claim 1 wherein said lithium compound is selected from the group consisting of lithium fluoride and lithium carbonate.

7. A refractory brick batch mix according to claim 6 wherein said lithium compound is lithium fluoride.

8. A refractory brick batch mix according to claim 1 wherein there is incorporated a binder selected from the group consisting of phosphoric acid and sodium lignosulfonate.

* * * * *